May 24, 1960 D. W. SHERMAN 2,937,553
METHOD AND APPARATUS FOR CUTTING BLANKS AND ROTATING
ALTERNATE PIECES INTO FEEDING ALIGNMENT
Filed Sept. 12, 1955 2 Sheets-Sheet 1
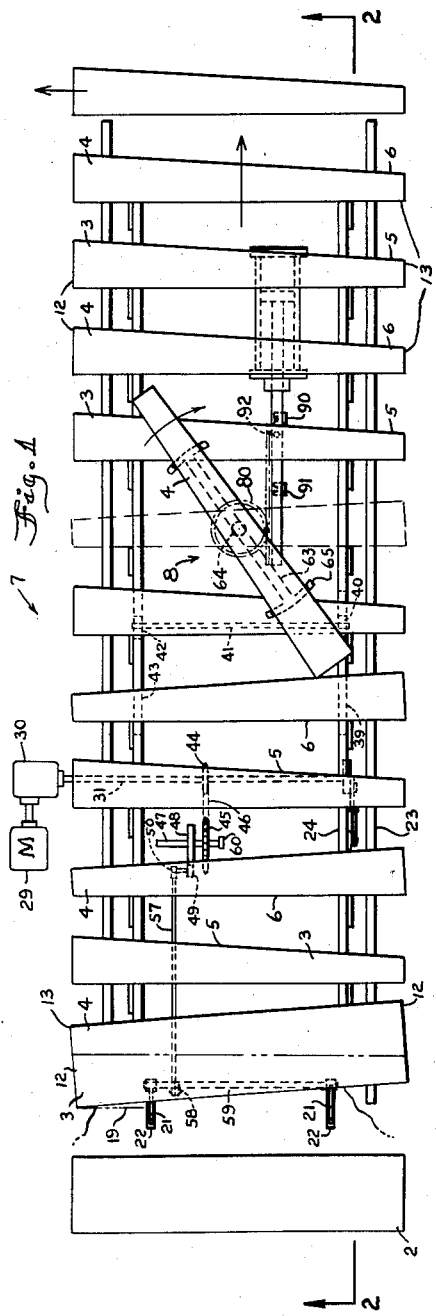
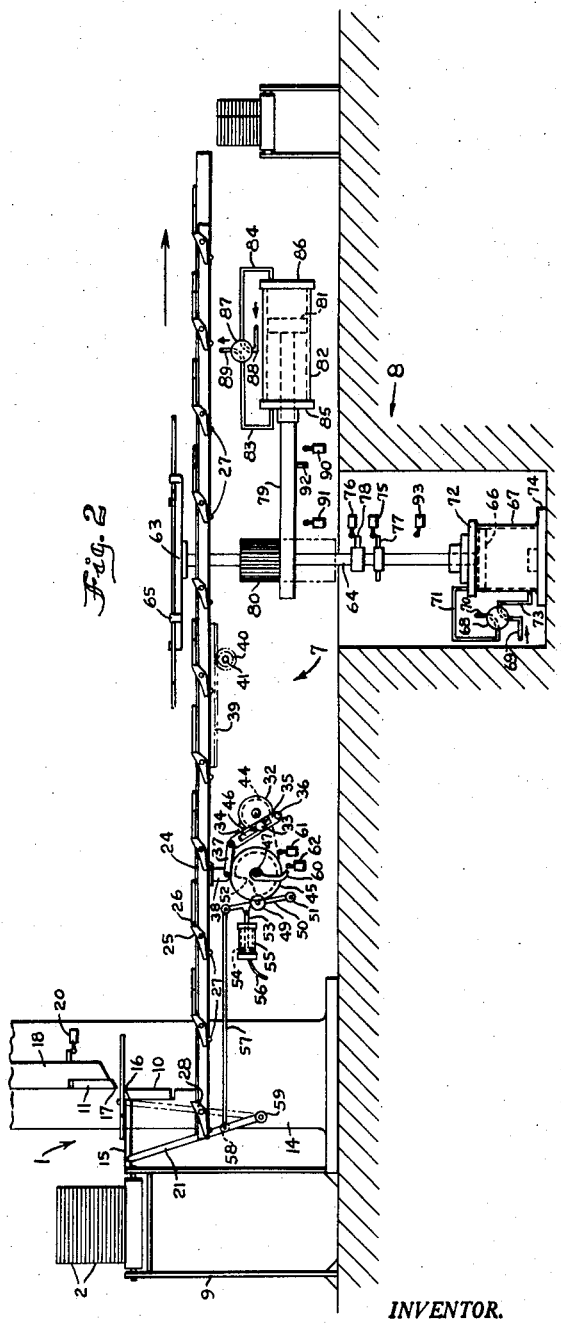
INVENTOR.
DONALD W. SHERMAN
BY
ATTORNEYS.

May 24, 1960 D. W. SHERMAN 2,937,553
METHOD AND APPARATUS FOR CUTTING BLANKS AND ROTATING
ALTERNATE PIECES INTO FEEDING ALIGNMENT
Filed Sept. 12, 1955 2 Sheets-Sheet 2
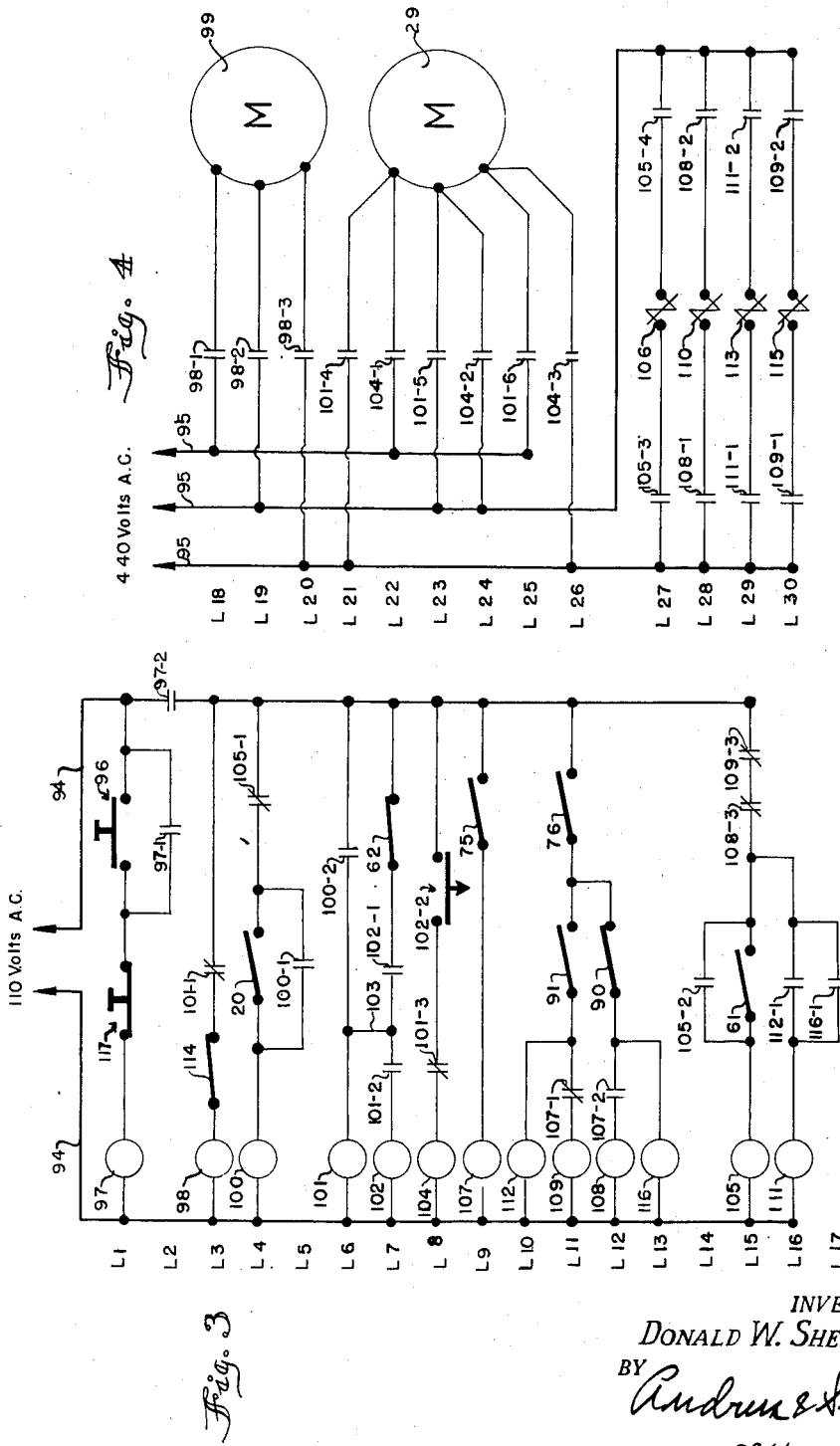
INVENTOR.
DONALD W. SHERMAN
BY
Attorneys

United States Patent Office 2,937,553
Patented May 24, 1960

2,937,553

METHOD AND APPARATUS FOR CUTTING BLANKS AND ROTATING ALTERNATE PIECES INTO FEEDING ALIGNMENT

Donald W. Sherman, Milwaukee, Wis., assignor to A. O. Smith Corporation, Milwaukee, Wis., a corporation of New York Filed Sept. 12, 1955, Ser. No. 533,746

10 Claims. (Cl. 83—23)

This invention relates to a method and mechanism for working and handling of work blanks and particularly for the automatic separating of a blank into two similar blanks and rotating alternate blanks to dispose all the cut or separated edges of the blanks in the same relative direction.

An object of the invention is to provide for the mechanical rotating of alternate work blanks through 180 degrees.

Another object of the invention is to provide an automatic mechanism for rotating one of two workpieces formed by separation of a single blank into two pieces.

Another object of the invention is to provide a continuous cutting, conveying and rotating mechanism having an interlocking operation control wherein each operation stops itself and starts the next operation.

Another object of the invention is to provide for the automatic and diagonal cutting of a frame blank into two similar side bar blanks for a vehicle frame and then rotating one of the blanks to have the cut edges facing in the same direction.

A further object of the invention is to provide an automatic mechanism for diagonal shearing of a rectangular blank into two similar workpieces, placing the workpieces on a conveying means in the same relative position as sheared and subsequently raising and rotating one of said pieces to face in the same direction as said other of the pieces and then again depositing it upon the conveying means.

The drawings furnished herewith illustrate the best mode presently contemplated for carrying out the invention.

In the drawings:

Figure 1 is a plan view of a cutting, conveying and rotating mechanism constructed in accordance with the present invention;

Fig. 2 is a sectional view taken on line 2—2 of Figure 1;

Fig. 3 is a schematic circuit for control of the mechanism shown in Figs. 1 and 2; and Fig. 4 is a schematic circuit for the power connections of the mechanism shown in Figs. 1 and 2.

Referring to Figs. 1 and 2 of the drawings, a shear 1 cuts generally rectangular, metal sheets 2 into a pair of blanks 3 and 4, each having a similar diagonal edge 5 and 6, respectively. The pieces are transferred to a conveyor 7 and moved to a work area where every other blank is rotated through 180° by a rotator 8 to face the edges 5 and 6 in the same direction. The shear 1, conveyor 7 and rotator 8 operate successively in that order during each complete cycle and are interlocked by an electrical circuit, as shown in Fig. 3 and more fully described hereinafter, such that each respective unit starts the succeeding unit and discontinues its own operation.

The sheets 2 are transferred from a support 9 or other suitable source and are placed between a pair of knives 10 and 11 of the shear 1 by hand or by suitable mechanical mechanism, not shown. The sheets 2 are relatively thin and of rectangular shape and are cut into two identical blanks 3 and 4, each having a wide end 12 and a narrow end 13 formed by the diagonal cut edges 5 and 6, respectively. In order to permit storing or delivery of the blanks to another work area with the edges 5 and 6 similarly faced and therefore with the wide and narrow ends 12 and 13 aligned, every other blank, taken as those numbered 4, is rotated through 180 degrees.

The shear 1 comprises a base 14 having a shear bed 15 and the knives 10 and 11 disposed below and above the plane of the bed and immediately forward of the bed. The cutting edge 16 of the stationary knife 10 is disposed in the plane of the bed 15 and in cooperation with the cutting edge 17 of the movable knife 11 effects the separation of the sheets 2 when the knife 11 descends. A conventional ram 18 is driven by a suitable motive force such as a motor, not shown in Figs. 1 and 2, to vertically reciprocate the knife 11 with respect to the stationary knife 10.

Each sheet 2 is moved onto the bed 15 at an angle 19 with respect to the knives 10 and 11 to obtain the diagonal shearing of the sheet. As more clearly shown in Fig. 2, the sheet 2 extends laterally out over the forward edge of the bed between the knives 10 and 11 such that the foremost half of the sheet 2 is unsupported. Therefore, upon shearing of sheet 2, the blank 4 falls and is caught by the conveyor 7.

As the ram 18 moves to top dead center, it actuates a switch 20 which starts the conveyor 7 and stops the shear 1 as more fully described hereinafter.

The conveyor 7 moves the blank 4 along and after advancing the blank from beneath the shear 1, it actuates a pair of spaced levers 21 which are pivotally supported beneath the bed 15.

When pivoted, each lever comes up within a slot 22 in the bed, strikes the back edge of the blank 3 and pushes it onto the conveyor 7 as shown in dotted lines in Fig. 2. As more fully described hereinafter, the movement of levers 21 is controlled by the movement of conveyor 7 such that the blank 4 is moved along before the blank 3 is pushed onto the conveyor 7.

The conveyor 7 has a pair of laterally spaced longitudinal supporting members or bars 23 upon which the blanks 3 and 4 rest. Within the space between bars 23, there is a pair of laterally spaced reciprocating bars 24. A series of dogs 25 are centrally pivoted to the reciprocating bars 24 as by pins or the like. The forward ends of dogs 25 extend upwardly above the level of the members 23 and bars 24 to provide a vertical pushing surface 26 which engages the back edge of each blank 3 or 4 and moves it forwardly as the bars 24 advance. A stop 27 is secured to the bars 24 and extends outwardly immediately beneath the rearward end of dogs 25 to prevent them from tipping when moved in a forwardly direction. On the other hand, when the bars 24 reciprocate rearwardly, the dogs 25 tip freely and ride beneath the blanks.

The dogs 25 are longitudinally spaced to accommodate the blanks 3 and 4 and are disposed with relation to the shear 1 in a manner that as blanks 3 and 4 drop from the shear 1 onto the supporting bars 23, the first pair of dogs 28 are immediately in back of it.

Upon the successive forward movement of the bars 24, the successively dropping blanks 3 and 4 are advanced by the dogs 25 in regulated steps.

Reciprocation of the bars 24 is affected by a motor 29 connected through a suitable speed reducing mechanism 30 and connecting linkage as subsequently described.

The speed reducing mechanism 30 is a conventional gear system or the like and is therefore illustrated in block form.

The motor 29 is connected through mechanism 30 to drive an output shaft 31 having a disc-shaped crank 32 keyed thereto. A cam 33 is secured to the outer periphery of the crank 32 and rides in a slot 34 in a pivoted lever 35. As the crank 33 rotates, the movement of the cam 33 in slot 34 oscillates the lever 35 about a pin 36 to which one end of lever 35 is pivotally attached. The opposite end of lever 35 is pinned to a connecting link 37 which is connected to a lug 38 depending from one of the side bars 24 shown as the front side bar in the drawings. This affects reciprocation of the latter side bar 24. In order to effect simultaneous reciprocation of the opposite side bar, a rack 39 is secured to the lower surface of the directly driven side bar and drives a gear 40 which is keyed to one end of a rotatable shaft 41 extending transversely beneath the reciprocating bars 24. A gear 42 is secured to the opposite end of the shaft 41 and drives a rack 43 which is secured to the underside of the adjacent side bar 24. Consequently, for each 360 degree rotation of the crank 32, the side bars 24 complete one reciprocation.

To synchronize the reciprocation of the conveyor and the rejection of the second blank 3 from the shear 1, as previously described, the reject levers 21 are actuated by a linkage driven from the output shaft 31. A sprocket 44 is keyed to the output shaft 31 and transmits power to a sprocket 45 through a connecting chain 46. The driven sprocket 45 is twice as large in diameter as the driving sprocket 44 whereby two revolutions of the latter effects a single revolution of the former. The sprocket 45 is keyed to a shaft 47 which also has a cam 48 keyed thereto.

The cam 48 is engaged by a cam follower 49 which is centrally attached to a lever 50 pivoted at one end as by a pin 51. On the periphery of the cam 48 a detent 52 is formed into which the cam follower 49 rides once each revolution of the sprocket 45.

To maintain the cam follower 49 in contact with the periphery of cam 48, a connecting rod 53 ties the cam follower 49 to a piston 54 which is biased toward the cam by a fluid in a cylinder 55 housing the piston. Cylinder 55 is connected to a suitable fluid source, not shown, by conduit 56.

As the cam follower 49 rides into the detent, it pivots the lever 50 which is connected at its outer end to one end of a rigid link 57. The opposite end of link 57 is attached to a crank 58 which turns a cross bar 59 joining the levers 21 and consequently the pivoting of lever 50 is transmitted to levers 21. As previously described, the levers 21 pivot through the slots 22 in the bed of the shear 1 and eject the blank 3 therefrom.

As the driven sprocket 45 continues to rotate, the cam follower rides out of the detent and returns the levers 21 to a normal retracted position beneath the shear bed 15. Because the driven sprocket 45 and consequently cam 48 makes one revolution for each two of the output shaft 31 driving the conveyor 7, the blank 4 is removed from in front of the first dog 28 before the blank 3 is rejected onto the conveyor.

The conveyor 7 then advances the blanks 3 and 4 forwardly one more step or position. When the conveyor begins to reciprocate rearwardly for the second time, a switch arm 60 which is secured to the shaft 47 actuates a switch 61 which starts the operation of the rotator 8. When the conveyor has reciprocated back to its starting position, arm 60 actuates a switch 62 which stops the further operation of the conveyor. The circuitry including the switches 61 and 62 is more fully described hereinafter with respect to Fig. 3.

The rotator 8 comprises a lifting member 63 secured to the top of a vertically movable and horizontally rotatable shaft 64 adapted to raise the blanks 4 when they register with member 63 and then to rotate them through 180 degrees. This disposes the blanks 4 with the diagonal edge 6 facing the same direction as edge 5 of blank 3. The member 63 fits between the reciprocating bars 24 and has transverse, U-shaped ends 65 which are adapted to receive the blanks 4 and hold them on the platform during rotation.

To raise and lower the platform, above and below the level of the supporting members 23, the lower end of shaft 64 is coupled to a fluid actuated piston 66 which is confined within a cylinder 67. A solenoid valve 68 alternately connects a fluid inlet pipe 69 and fluid exhaust pipe 70 with tube 71 adjacent the head 72 and a tube 73 adjacent the base 74 of the cylinder 67. With the valve 68 connecting the fluid inlet 69 with tube 73 and the fluid exhaust 70 with tube 71, the piston 66 and consequently the lifting member 63 rises to lift the blank 4 above the level of the supporting members 23. With the valve 68 connecting the fluid inlet 69 and tube 71 and the fluid exhaust with tube 73, the piston 66 and consequently the member 63 lowers, dropping the blank 4 back onto the supporting members 21 of the conveyor.

The position of the valve 68 is electrically controlled in response to completion of a cycle by the conveyor 7 and by a time delay mechanism, as more fully described hereinafter.

A pair of switches 75 and 76 are secured adjacent the shaft 62 and are actuated when the lifting member 62 is raised by the respective switch arms 77 and 78 carried by the shaft 64. As appears more fully in the description of the electrical control circuit shown in Fig. 3, switch 75 sets up the rotating circuit generally and switch 76 sets up the circuit for forward rotation of the shaft 64 and member 63. As switch 76 sets up the rotator for forward rotation, it is to be actuated every other time the table raises. Consequently, the associated switch arm 78 extends to only one side of shaft 64 and is moved into a switch actuating position with reverse rotation of the shaft.

When the lifting member 63 is raised, a time delay occurs before it again lowers which is sufficient to allow a 180 degree rotation of the shaft 64 and member 63.

The rotation is effected first in one direction and the next time in an opposite direction by a reciprocating rack 79 disposed in engagement with a gear 80 secured to the lifting shaft 64. While the rack 79 is vertically stationary, the gear 80 raises and lowers with the shaft 64. The gear 80 is made of a sufficient width to maintain engagement with the rack 79 in both its uppermost and its lowermost position.

In order to reciprocate the rack 79 and consequently rotate the shaft 64, the rack is secured to a piston 81 which travels within a cylinder 82. Fluid passages 83 and 84 are connected in communication adjacent the cylinder's head 85 and base 86, respectively, and alternately apply fluid pressure to the opposite sides of the piston.

The pressure application to the piston 81 is controlled by a solenoid valve 87 which alternately connects the passages 82 and 83 to an inlet pipe 88 connected with a source of fluid, not shown, and to an exhaust pipe 89 connected with an exhaust, not shown. When the valve 87 connects the passages 83 to pipe 88, the piston 81 moves in an outward or forward direction to effect a clockwise rotation of the lifting member 63. And, when the valve 87 connects the passage 84 to pipe 89, the piston 81 moves in an inward or retracted position and effects a counterclockwise rotation of the lifting member 63.

The position of valve 87 is determined by the switches 90 and 91 which are disposed to be actuated by the rack 79. Switch 90 is held closed by a switch arm 92 with the rack in a retracted position. As the rack reaches its foremost or extended position, the arm 92 closes switch 91. The switches 90 and 91 open as the switch arm 92 moves from them. The switches 90 and 91 also control a relay circuit which causes the lifting member 63 to be again lowered beneath the level of the supporting members 23. The electrical control devices and circuit incorporating switches 90 and 91 is more fully described hereinafter.

When the member 63 reaches its lowermost position, it actuates a switch 93 in the electrical control circuit which begins the operation of shear again.

The operation of the apparatus is described hereinafter in connection with schematic wiring diagram of the control circuit and the power circuit, shown respectively in Figs. 3 and 4 of the drawings.

In the diagrams, the main power lines are designated by number 94 and the control power lines by number 95. The branch lines connected thereto are successively numbered L1, L2, L3, etc. starting from the top of the wiring diagram in Fig. 3 and continuing on into Fig. 4. In describing relays and various contacts controlled thereby, the relay is given a unique number and its contacts are given by the relay number and a subnumber. The subnumber for each relay starts with one and continue in regular numerical order to the last contact controlled by that relay.

Referring to the control circuit illustrated in Fig. 3, the apparatus is started by manually closing the starting or master switch 96 in line L1 to energize the main control relay 97 which closes the associated contacts 97–1 and 97–2. The contacts 97–1 are in line L2 which bridges the starting switch 96 and thereby locks in the relay 97. The contacts 97–2 are in one of the power lines 94 and close the power supply to the various control lines and initially start the shear 1.

A shear control relay 98 in line L3 is energized when contacts 97–2 close because all switches and contacts in line L3 are normally closed. The relay 98 closes associated contacts 98–1, –2 and –3 in the respective three phase lines L18, L19 and L20 of the power circuit shown in Fig. 4. The closing of contacts 98–1, –2 and –3 energizes a three phase electric motor 99 which drives the ram 18 through suitable gearing, not shown.

The shear 1 completes a cycle of operation and on its return stroke momentarily closes the switch 20 in line L4 connected in series with a relay 100 in the line L4 to thereby energize the relay 100. Upon energization, the relay 100 closes a set of associated locking contacts 100–1 connected in line L6 which bridges the switch 20 and locks the relay 100 in circuit independently of the switch 20. A second set of associated contacts 100–2, connected in line L6, are also closed upon the energization of relay 100.

This closing of contacts 100–2 completes the circuit for energizing a conveyor control relay 101 which is connected in series with the contacts 100–2 in line L6. The relay 101 then pulls out a set of contacts 101–1 in the line L3 containing the shear control relay 98 and stops further operation of the shear press for the duration of the conveyor operation.

A timing circuit is also completed by energization of relay 101 as it closes a set of associated contacts 101–2 in line L7. When contacts 101–2 close, a timing relay 102, also in line L7 is energized through the contacts 100–2 due to a jumper lead 103 which connects lines L6 and L7 in the following circuit; starting with the left-hand power line 94, proceeding through the series connected relay 102 and contacts 101–2 in line L7 and then following up to line L6 via the jumper lead 103, and returning to the right-hand power line 94 through contacts 100–2.

The timing relay 102 pulls in a set of locking contacts 102–1 in line L7 to maintain energization of the relays 101 and 102 independently of the contacts 100–2. The contacts 100–2 are shunted or by-passed because, as appears hereinafter, they open before the conveyor 7 has completed a cycle of operation.

The timer relay 102 also pulls in a set of normally open contacts 102–2 in line L8 which controls a plugging relay 104 for the conveyor motor, as more fully described hereinafter.

A set of normally closed contacts 101–3 in line L8 are opened when the forward drive relay 101 is energized in order to break the line L8 and prevent energizing of the plugging relay 104 until the forward drive connection is opened by de-energization of relay 101.

Referring to Fig. 4, the energization of relay 101 pulls in the contacts 101–4, –5 and –6 in respective lines L21, L23 and L25 which completes the forward drive connection of the conveyor motor 29. The conveyor 7 then goes through a cycle of operation.

As previously described, the conveyor 7 advances the blanks 3 and 4 in steps. The first blank 4, dropping onto the conveyor, is advanced one step after which the conveyor reciprocates rearwardly to pick up the other blank 3 which is rejected onto the conveyor by the levers 21. The blanks 3 and 4 are then advanced another step and the conveyor reciprocates rearwardly. When the conveyor 7 starts its second rearward travel, the switch arm 60, driven by the conveyor motor 29, momentarily closes the switch 61, in line L15 of Fig. 3, and starts the raising action of the rotator 8.

The closing of switch 61 also results in the opening of relay contacts 100–2 and consequently the relays 101 and 102 are now only energized through the timer contacts 102–1 and the disconnect switch 62.

When the conveyor completes a cycle of operation, it momentarily actuates the switch 62 and the timer relay 102 opens its contacts 102–1 to break the line L7 and de-energize relays 101 and 102. When relay 101 is de-energized, the associated power contacts 101–4, –5 and –6 open and the conveyor motor 29 is de-energized.

Further, when relay 101 is de-energized, the associated contacts 101–3 in line L8 close and the relay 104 is energized even though the relay 102 which closes contacts 102–2 is de-energized. This is true as contacts 102–2 are timed out; i.e., remain closed a predetermined period after de-energization of the timer relay.

Energization of reverse relay 104 closes the associated power contacts 104–1, –2 and –3 in the respective lines L22, L24, and L26 of the power supply system to the conveyor motor shown in Fig. 4. The contacts 94–1, –2 and –3 connect the motor 29 in reverse polarity and, consequently, the power to the motor 29 is in reverse direction. This results in a rapid de-acceleration of the motor as is well-known in the motor art. After a couple of seconds the motor 29 is stopped and the timer relay contacts 102–2 drop out. The reversing relay 104 is de-energized and the power supply system to the conveyor motor 29 is opened.

As previously set forth when the conveyor returns or reciprocates rearwardly on the second stroke, it momentarily closes the switch 61 in line L15. This completes the circuit for a relay 105 in line L15 and initiates the raising of the table.

A set of associated contacts 105–1 in line L4 are opened as a result of energization of relay 105 and de-energize the relay 100. Thereupon, relay contacts 100–2 open. Although this occurs before the conveyor has finished the above cycle, this does not effect the operation of the conveyor 7 because the contacts 100–2 are shunted by contacts 102–1 and switch 62 which control the circuit as previously described.

When relay 105 is energized, it also closes a set of locking contacts 105–2 in line L14 which shunt the switch 61 and maintains relay 105 energized independently of switch 61. Further, it also closes the power contacts 105–3 and –4 in line L27 for the lifter control solenoid 106. When the solenoid 106 is energized, it actuates the solenoid valve 68 to raise the lifting member 63.

As the member 62 reaches its uppermost position, it mechanically closes the switch 75 in line L9 and the switch 76 in line L11.

The switch 75 is actuated every second time the member 62 raises and completes the circuit for a control relay 107 in line L9 which when energized places a rotating control circuit in position for forward rotation. The relay 107 controls the normally closed contacts 107–1 in the line L11, and the normally open contacts 107–2 in the line 42. The contacts 107–2 and 107–1 are in series with the parallel connected forward and reverse rotation relays 108 and 109 respectively.

When relay 107 is energized, the contacts 107–1 are opened and this prevents energization of the reverse rotation relay 109. At the same time, the contacts 107–2 are closed and this permits energization of the forward rotation relay 108. The switch 75 is therefore closed to effect energization of relay 107 every other time the member 62 raises and thereby provides for the forward rotation of the lifting member 62. On the alternate times, the switch 75 remains open and the lifting member 63 is permitted to rotate back to its initial position.

Connected in series with the parallel connected relay 109 in line L11 and relay 108 in line L12 is the member actuated switch 76 in line L11. Therefore, when member 63 closes switch 76, one of the relays 108 and 109 is energized depending upon the position and control contacts 107–1 and 107–2.

Assuming switches 75 and 76 are actuated to effect forward rotation of the lifting member 63, the relay 108 in line 42 is energized and closes contacts 108–1 and –2 in line L28 of Fig. 4 and opens the contacts 108–3 in line 45.

When contacts 108–1 and –2 close, the power circuit to solenoid 110 is completed. Solenoid 110 actuates the valve 87 which connects a fluid source to the cylinder 82 to effect the rotation of the lifting member 63 by the movement of rack 79.

The opening of contacts 108–2 breaks the line L15 and relay 105 is de-energized. The locking contacts 105–2 open and relay 105 cannot be energized until switch 61 is again actuated by the conveyor 7, as previously described. Further, the opening of contacts 108–3 in line L15 prevents energization of a lowering relay 111 in line L16.

When the rack 79 moves to its forward or extended position it opens the switch 90 in line L12 and closes the switch 91 in line L11 to initiate the lowering of member 63.

Switch 90, when opened, breaks the circuit to relay 108 and the contacts of the latter return to their normal position. Contacts 108–1 and –2 in line L28 open and de-energize the forward rotation solenoid 110. Also, contacts 108–3 in line L15 close to allow lowering of member 63 as now described.

Switch 91 in closing completes a circuit energizing a control relay 112 in line L10 which is connected to the line L11, as shown. The relay 112 pulls in a set of associated contacts 112–1 located in line L16 and thereby completes the circuit for the lowering relay 111 also in line L16. The relay 111 then pulls in a set of contacts 111–1 and –2 in line L29.

When contacts 111–1 and –2 close, the lowering solenoid 113 is energized and turns the valve 68 to register the fluid source and the piston-cylinder such that the piston 66 and member 63 is forced down.

As the member 63 descends, the switches 75 and 76 open and the various control relays are de-energized to place the rotating apparatus in standby position.

Further, when member 63 reaches its lowermost position, it closes a switch 114 in line L3 which was opened as the lifter member 63 rose. Therefore, when the rotator 8 is going through a cycle of operation the shear control relay 98 is de-energized when the rotator 8 completes a cycle of operation and closes switch 114, the shear 1 is started.

As previously described, the rotator 8 starts a cycle of operation before the conveyor 7 completes a cycle of operation. Therefore, the switch 114 opens to break the circuit to the shear control relay 98 before the contacts 101–1 of the conveyor control relay 101 close and the relay 98 is not energized until the end of the rotator's cycle of operation.

The shear 1 and conveyor 7 then go through the same cycles as described above. On the second cycle, the lifting member 63 is raised in the same manner as previously described but in this instance the control switch 75 is not closed. Consequently, relay 107 is not energized and the associated contacts 107–1 in line L11 and 107–2 in line L12 remain in their normally closed and opened position, respectively.

The circuit for forward rotation relay 108 in line L12 is maintained open by contacts 107–2 during the cycle under consideration. But, now the circuit for the reverse rotation relay 109 in line L11 is closed through the contacts 107–1. Further, the switch 91 in line L11 is now held closed because of the forward or extended position of the rack 79. Therefore, when lifting member 63 reaches its uppermost position and actuates switch 76 in line L11, the relay 109 is energized.

Thereupon, the power contacts 109–1 and –2 in line L30 are closed and complete the energization circuit for a reversing solenoid 115 in line L31. The solenoid 115 is coupled to the solenoid valve 87 and moves the latter to effect a retraction of the rack 79 by the movement of piston 81.

Energization of relay 109 also results in the opening of a set of contacts 109–2 in line L15 to de-energize the relay 105 and to prevent energizing of the lowering relay 111, in line L16 in the same manner as did contacts 108–2 in the first cycle of operation.

At the end of the reverse rotation, the switch 91 in line L11 has opened and the switch 90 in line L12 is closed by the rack 79.

Opening of switch 91 de-energizes the reverse rotation relay 109 which opens the power circuit to the solenoid 115. It also allows the contacts 109–2 in line L15 to close and permits energizing of the lowering relay 111 in line L16.

The lowering relay 111 is energized as a result of the closing of switch 90 in line L12. Switch 111 connects a relay 116 in line L13 and consequently effects a closing of a set of relay contacts 116–1 in line L17. The contacts 116–1 are in parallel with contacts 112–1 in line L16 and the closing thereof results in the energization of the lowering relay 111 in the same way as the closing of 112–1.

The member 63 is lowered and as it reaches its lowermost position, it again closes switch 114 to start the shear 1 as previously described.

Thereafter, the above first and second described cycles are continuously repeated until the relay 97 is de-energized. The relay 97 can be de-energized by momentarily opening a manual push button switch 117 in line L1. The switch 117 breaks the circuit to relay 97 which then drops out the locking contacts 97–1 in line L2 and the contacts 97–2 in the main power line 94.

The present invention provides an automatic mechanism for diagonally cutting a single blank into a pair of similar and opposed blanks and subsequently rotating every other blank to have the blanks in the same relative position in a continuous operation.

Various modes of carrying out the invention are contemplated as being within the scope of the following claims particularly pointing out and distinctly claiming the subject matter which is regarded as the invention.

I claim:

1. An automatic method of material handling, which comprises continuously forming a pair of matching blanks by separating a single workpiece into two pieces, transferring the blanks from the point of separation, and thereafter rotating every other of said pair of blanks through 180 degrees to dispose the blanks with the separated edges facing in the same direction.

2. An automatic machine for material handling, which comprises means to separate a series of workpieces into a pair of similar blanks, a conveyor for transporting the blank from said means, means to transfer the blanks to the conveyor, means to rotate every other blank through 180 degrees, means responsive to the separation of one of said workpieces to stop the first named means and to start the conveyor, means responsive to a predetermined conveyor movement to stop the conveyor and to start the means to rotate every other blank, and means responsive to said rotating means to stop the rotating means and to start the separation means.

3. In an automobile frame assembly line, a shear adapted to diagonally cut a workpiece into a pair of blanks having similar diagonal edges in adjacent relation, a conveyor to transport the blanks from the shear press, means responsive to the completion of one cycle of the shear to stop the shear and to start the conveyor, a rotator adapted to take every other of said blanks from the conveyor and rotate said blank through 180 degrees and then redeposit the blank upon the conveyor whereby the diagonal edge of said blank is disposed in the same direction as the adjacent blanks, means responsive to the completion of a cycle of operation for the conveyor to stop the conveyor and to start the rotator, and means responsive to the completion of a cycle of operation of the rotator to stop the rotator and to start the shear.

4. In an automatic handling mechanism for a series of workpieces, means for receiving and conveying the workpieces in steps, said workpieces being disposed on the conveyor in pairs having similar diagonal extending edges which face in opposite directions, means to rotate every other of the workpieces to face the diagonal edges in the same direction, means responsive to two steps of the workpieces to stop the conveyor and to start the rotator, and means responsive to the rotation of a workpiece to stop the rotator and to start the conveyor.

5. In an automatic machine for the manufacture of a vehicle frame, a shear adapted to diagonally cut a plurality of rectangular metal sheets each into a pair of similar blanks, means to successively deposit the blanks onto a conveyor with the cut edges still facing in opposite directions, a rotator adapted to pick up alternate blanks and rotate them through 180 degrees to face the cut edges in the same direction, electrical circuit means responsive to the operation of the conveyor and the rotator to stop the conveyor and to start the rotor as the alternate blanks register with the rotator and to stop the rotator after a blank is rotated through 180 degrees.

6. In an automatic fabrication and assembly line for a vehicle body frame, a shear adapted to diagonally cut a rectangular metal sheet to provide a pair of frame blanks, a conveyor adapted to receive the blanks in the same relative position and to transport the blanks to a subsequent work station, said conveyor having a bed with an opening, means to stop the conveyor when every other blank is in registry with the opening, a rotator adapted to be moved up and down through the opening to lift the registered blank and to rotate it through 180 degrees and to again deposit it on the conveyor with the diagonal edge facing in the same direction as the immediately adjacent blanks, and means responsive to the lowering of the rotator to initiate the operation of the conveyor.

7. In the automatic frame manufacture of a vehicle frame, a shear adapted to cut a rectangular sheet on a diagonal to form a pair of blanks having adjacent and oppositely faced diagonal edges, a reciprocating conveyor to receive the blanks in as-cut position and having an opening with which the blanks register on the end of the forward stroke of the conveyor, means responsive to the end of the stroke of the shear to stop the shear and to start the conveyor, a series of centrally pivoted dogs each having a vertical surface adapted to engage the edge of a blank and move it forwardly and adapted to pivot under the adjacent blank on the return stroke, means to prevent the pivoting of the dogs on the forward motion of the conveyor, means responsive to a second stroke of the conveyor to stop the conveyor every other blank in registry with the opening, a rotatable member disposed in alignment with said opening in the conveyor and normally below the level of travel of the blanks, means responsive to the deposit of the second blank to raise the rotatable member and thereby lift the registered blank above the level of the other blanks, means responsive to the lifting of the blank to rotate the member and thereby rotate the blank through 180 degrees, means responsive to the 180 degree movement to lower the table and thereby deposit the blank onto the conveyor, and means responsive to the lowering of the member below the level of the blanks to stop the rotatable member and to start the shear.

8. An automatic vehicle frame fabrication line having in combination, a shear adapted to continuously separate a series of rectangular plates on a diagonal to provide a pair of identical blanks, the first of the blanks falling from the shear when the plate is separated, a conveyor having a series of reciprocating dogs adapted to transport the blanks in steps, said conveyor being disposed adjacent the shear to receive the first blank as it falls from the shear, means responsive to the separation of each plate to stop the shear and to start the conveyor, means operated by the conveyor and adapted to eject the second of the blanks after one reciprocation of the conveyor, a rotator adapted to pick up every other blank from the conveyor and rotate it through 180 degrees and then redeposit it upon the conveyor, means responsive to the conveyor operation to start the rotator after the second blank has been stepped forward and to prevent operation of the shear during operation of the conveyor, means responsive to conveyor operation to stop the conveyor after the second reciprocation thereof, and means responsive to the operation of the rotator to prevent operation of the shear during the operation of the rotator and to start the shear after re-depositing the blank onto the conveyor.

9. A machine for manufacturing vehicle frames having in combination, reciprocating means adapted to continuously transport a series of similar blanks along a transfer line with every other blank facing in the wrong direction, rotating means adapted to pick up a blank and rotate it through 180 degrees, means responsive to registration of every blank with said rotating means to temporarily stop further movement of the blanks and to start the rotating means, and means responsive to a redeposit of the rotated blank onto the transfer line to stop the rotator and to initiate the reciprocating means.

10. A machine for fabrication of vehicle frames having in combination, a shear adapted to separate a rectangular plate into a pair of similar blanks facing in opposite directions, reciprocating conveyor bars disposed adjacent the shear having a series of equally spaced dogs to form blank receiving spaces between the dogs, said dogs being adapted to move the blank forward on the forward stroke of the reciprocating bars and to pivot and ride beneath the blanks on the backward stroke of the reciprocating bars, means to transfer one of the blanks to a first blank receiving space immediately upon the separation of the plate, means responsive to the separation of the plate to stop the shear and to start the conveyor bars, and means actuated by the conveyor to eject the second blank to the first blank receiving space after the first blank is removed.

(References on following page)

References Cited in the file of this patent

UNITED STATES PATENTS

| | | |
|---|---|---|
| 1,900,428 | Cochran | Mar. 7, 1933 |
| 1,946,375 | Wentjar | Feb. 6, 1934 |
| 2,129,133 | Iben | Sept. 6, 1938 |
| 2,478,020 | Le Conie Stiles | Aug. 2, 1949 |
| 2,609,874 | Pedron | Sept. 9, 1952 |
| 2,616,501 | Smith | Nov. 4, 1952 |
| 2,628,680 | Seybold | Feb. 17, 1953 |
| 2,658,608 | Wehmiller | Nov. 10, 1953 |
| 2,669,343 | Berry | Feb. 16, 1954 |
| 2,682,344 | Preis et al. | June 29, 1954 |
| 2,690,218 | Robinshaw | Sept. 28, 1954 |
| 2,708,968 | Soave | May 24, 1955 |
| 2,780,340 | Hynson | Feb. 5, 1957 |

UNITED STATES PATENT OFFICE
CERTIFICATE OF CORRECTION

Patent No. 2,937,553                          May 24, 1960

Donald W. Sherman

It is hereby certified that error appears in the printed specification of the above numbered patent requiring correction and that the said Letters Patent should read as corrected below.

Column 9, line 49, for "rotor" read -- rotator --.

Signed and sealed this 6th day of December 1960.

(SEAL)
Attest:

KARL H. AXLINE
Attesting Officer

ROBERT C. WATSON
Commissioner of Patents